(12) United States Patent
Van Den Burg et al.

(10) Patent No.: US 6,440,225 B1
(45) Date of Patent: Aug. 27, 2002

(54) FLOOR TREATING METHOD AND MACHINE

(75) Inventors: Michael Van Den Burg, Vlaardingen (NL); Josef Jans, Munchwilen (CH); Frederik Jan Schepers, Maarssen (NL); Rolf Semmler, Munchwilen (CH); Pieter Van Der Vlist, Vlaardingen (NL)

(73) Assignee: Diversey Lever, Inc., Plymouth, MI (US)

( * ) Notice: Subject to any disclaimer, the term of this patent is extended or adjusted under 35 U.S.C. 154(b) by 0 days.

(21) Appl. No.: 09/504,821

(22) Filed: Feb. 16, 2000

(30) Foreign Application Priority Data

Feb. 26, 1999 (EP) .............................. 99200553

(51) Int. Cl.⁷ .......................... A47L 13/00; A47L 11/00
(52) U.S. Cl. .............................. 134/6; 134/10; 134/19; 134/21; 134/38; 134/40
(58) Field of Search ........................... 134/6, 7, 10, 19, 134/21, 26, 40, 38; 510/201, 203, 205, 241, 405, 434, 435, 437, 477

(56) References Cited

U.S. PATENT DOCUMENTS

| | | |
|---|---|---|
| 3,753,777 A | 8/1973 | Thomsen et al. |
| 3,976,501 A * | 8/1976 | Blue ............................ 134/10 |
| 4,107,813 A * | 8/1978 | Torres ........................... 15/246 |
| 4,264,479 A * | 4/1981 | Flanagan ....................... 252/524 |
| 4,276,673 A * | 7/1981 | Brook .......................... 15/52.1 |
| 4,749,508 A * | 6/1988 | Cockrell, Jr. et al. ........ 252/136 |
| 5,096,610 A | 3/1992 | Bingham |
| 5,342,551 A | 8/1994 | Ruckle |
| 5,411,716 A | 5/1995 | Thomas et al. |
| 5,525,182 A | 6/1996 | Miller |
| 5,797,986 A * | 8/1998 | Rolando et al. ................ 134/6 |
| 5,804,541 A | 9/1998 | Jans |
| 5,856,289 A * | 1/1999 | Kennedy ..................... 510/365 |

FOREIGN PATENT DOCUMENTS

EP 0 353 408 2/1990

* cited by examiner

Primary Examiner—Randy Gulakowski
Assistant Examiner—J Smetana

(57) ABSTRACT

A method is provided for stripping a polymer film from a floor surface, comprising the steps of:

(a) applying a concentrated alkaline stripper solution including an alkaline agent and a solvent, to the polymer film;

(b) allowing this concentrated alkaline solution to chemically act on the polymer film during a contact time of at least 5 seconds;

(c) scrubbing the polymer film with a scrubbing device while diluting the concentrated alkaline solution with water, so as to obtain a sludge;

(d) vacuum cleaning the floor surface by suction of the sludge, whereby this method is carried out using one floor treating machine. This method is an integrated floor stripping procedure which is considerably more effective than known stripping methods of the prior art.

15 Claims, 3 Drawing Sheets

Fig.2b.
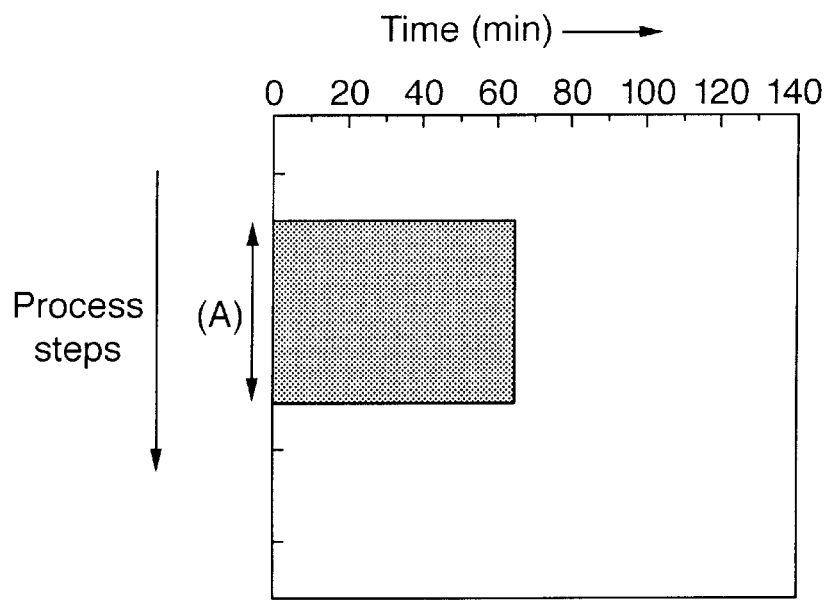
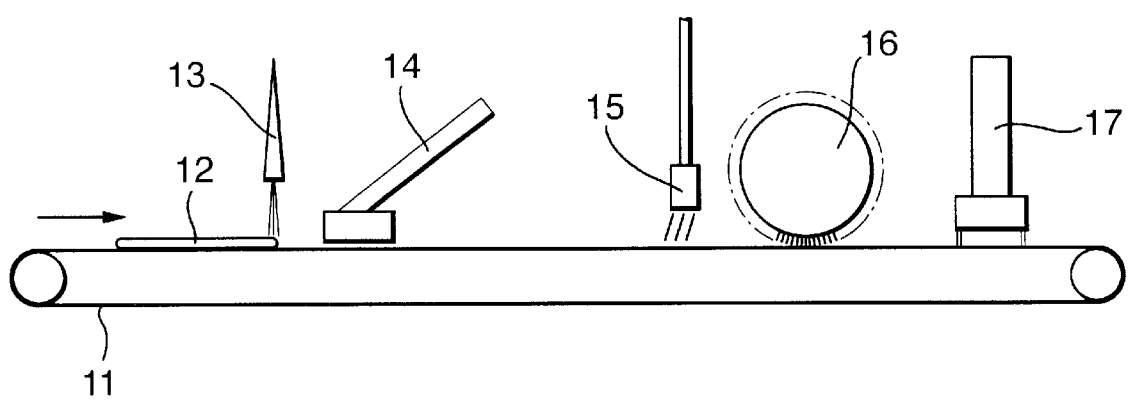
Fig.3.

FLOOR TREATING METHOD AND MACHINE

FIELD OF THE INVENTION

The present invention relates to a method for removing a polymer film from a floor surface. In particular, the invention relates to a method for stripping the polymer film from the floor surface, wherein a stripper formulation containing a solvent is applied. The invention also relates to a machine especially adapted for carrying out the method of the invention.

BACKGROUND OF THE INVENTION

Floor cleaning processes are well-known in the art. Some floor surfaces additionally need protection in order to facilitate the cleaning thereof, to avoid or diminish wear and for aesthetical reasons. Such protection can be obtained by applying to said floor surfaces soap-based products, wax-based products or polymer-based products. Polymer-based products which generally offer the best protection, are usually polymer dispersions comprising polymer, wax, alkaline soluble resin, plasticizer and water.

Polymer dispersions are applied onto the floor surface in the form of a thin polymer film, for instance a thin acrylate polymer film. This type of film is usually hard, transparent and resistant to wear. However, even durable polymer films are susceptible to attrition. Therefore, several products are commercially available for the maintenance of floor polymer films, the main constituent of said maintenance products being generally wax. When maintaining the floor polymer film, said wax is polished onto the surface thereof using a floor polishing machine. However, wear of the polymer is not significantly reduced by applying this method, and replacement of the polymer film will be needed after a certain period of use.

At present, replacement of polymer films is generally carried out using a floor stripping solution containing a solvent, such as a glycolether or a diglycolether, and an amine as a sequestering agent. In the usually applied known stripping method of the prior art, floor polymer films are generally removed from the floor surface using a single disc machine, by carrying out the following steps:

applying a dilute floor stripping solution to the floor surface, preferably using a stripping formulation/water ratio of 1:10 waiting a time period of 10–20 minutes for allowing said dilute solution to act with the polymer film:

scrubbing the floor surface using an abrasive pad mounted on a single disc machine;

vacuum cleaning the thus-formed sludge;

rinsing the floor surface with water; and again vacuum cleaning the floor surface.

We found that this known method for stripping a polymer film from a floor surface entails several problems, including the following:

during each of the various process steps of this known method several process variables need to be adjusted. Consequently, the customer can easily apply an inadequate process condition, which may lead to poor overall performance;

in view of this, the controllability of this known method is far from optimal;

a considerable amount of time is needed for fully carrying out this stripping method of the prior art;

this method may be hazardous, because of the slippery floor surface obtained after applying the dilute stripping solution.

It was surprisingly found that these problems could be overcome, by applying the stripping method according to the present invention.

DEFINITION OF THE INVENTION

Accordingly, in one aspect the present invention provides a method for stripping a polymer film from a floor surface, comprising the steps of:

(a) applying a concentrated alkaline stripper solution including a solvent, to the polymer film;

(b) allowing this concentrated alkaline solution to chemically act on the polymer film during a contact time of at least 5 seconds;

(c) scrubbing the polymer film with a scrubbing device while diluting the concentrated alkaline solution with water, so as to obtain a sludge;

(d) vacuum cleaning the floor surface by suction of the sludge, whereby this method is carried out using one floor treating machine.

Preferably, in step (c) the chemical action takes place during an undisturbed contact time of at least 5 seconds. In another aspect, the invention provides a floor treating machine adapted for carrying out the method of the invention, said machine comprising:

a container containing the concentrated alkaline stripper solution;

means for applying this concentrated solution to the polymer film;

a scrubbing device;

means for applying water of dilution to the floor surface during scrubbing; and a vacuumcleaning device.

BRIEF DESCRIPTION OF THE DRAWINGS

FIG. 2b shows the integrated floor stripping method of the invention;

FIG. 3 shows a schematic of a laboratory set up; and

DETAILED DESCRIPTION OF THE INVENTION

Figure 1:
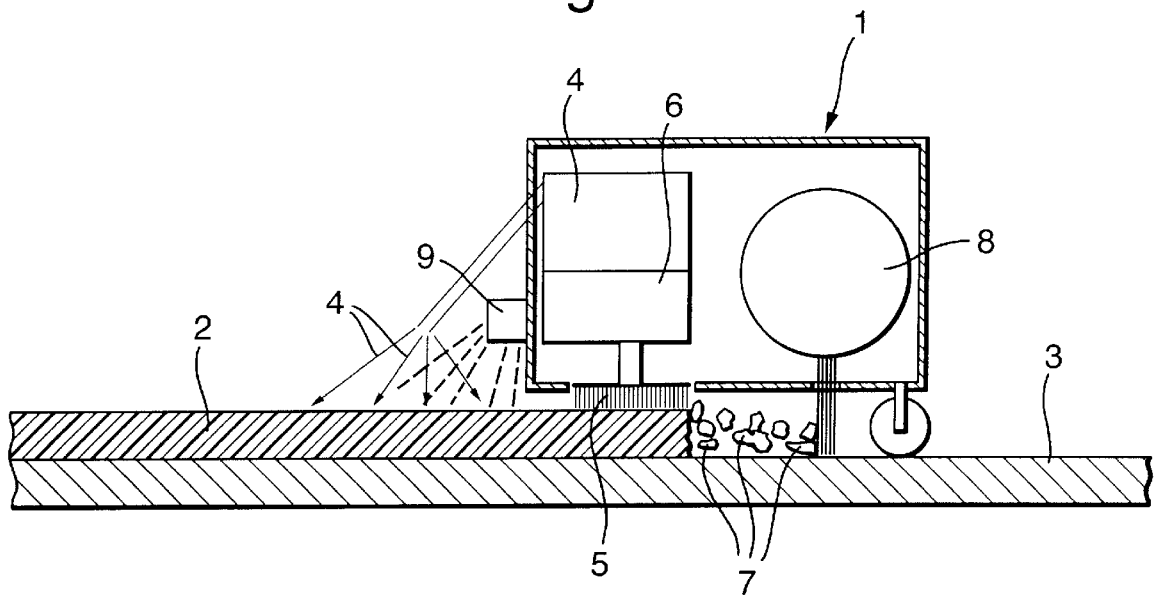
FIG. 1 depicts a single disc machine.

An essential feature of the method according to the invention is that all steps of said method are carried out using one floor treating machine. Therefore, the method of the invention is an integrated stripping procedure.

As compared to known stripping methods, the method of the invention is considerably more automated resulting in less errors and a more constant performance. Furthermore, the stripping method of the invention yields a much higher productivity than known stripping methods:

a significantly larger floor area can be treated during the same time period. For instance, when stripping 100 $m^2$ of polymer film from a floor surface it was found that using a known stripping method a time period of roughly 120 minutes was needed whereas the integrated method of the invention took only about 60 minutes (see the Examples).

In addition, in view of the integrated characteristic of the stripping method of the invention, it is safer and allows less contact by the operator with the chemicals applied.

As mentioned above, the concentrated alkaline stripper solution of the invention is allowed to act chemically on the polymer film during a contact time of at least 5 seconds, said contact time being preferably an undisturbed contact time so as to enable the stripper solution to optimally perform its chemical action on the polymer film. In order to apply such short contact times —of close to 5 seconds—, this stripper solution needs to be relatively concentrated. As a consequence, the concentrated alkaline stripper solution of the invention effectively contains at most 75% by weight of water, a water content of at most 60% by weight being more preferred.

For the same reason of effectiveness while applying a short contact time, the concentrated alkaline stripper solution of the invention preferably has a pH-value of 9 or higher, a pH of at least 11 being more preferred.

To obtain such high pH-values, the concentrated alkaline stripper solution preferably contains an alkaline agent which is desirably selected from alkali metal hydroxides, alkali metal carbonates and alkali metal metasilicates. The most preferred alkaline agent is sodium hydroxide.

The concentrated stripper solution of the invention further comprises a solvent. This solvent is preferably present in said stripper solution at a concentration of at least 5% by weight, a solvent concentration in the range of 5–80% by weight being more preferred. For the so-called "deep-stripping" process a solvent content of more than 50% by weight of the stripper solution is used. The solvent is preferably selected from the group consisting of glycolethers, diglycolethers, benzyl alcohol, and mixtures thereof. Particularly suitable solvents are butylglycolether, ethylglycolether, butyldiglycolether, and propylene glycolether. Other suitable solvents are phenyl glycolether and dipropyleneglycol-n-ether.

In order to further improve the effectiveness of the concentrated stripping solution of the invention, a wetting agent is desirably present in said solution. A suitable wetting agent which also has defoaming characteristics is a low-foaming nonionic surfactant, which is desirably present in the concentrated stripper solution of the invention at a concentration of 0.1–3% by weight. The low-foaming nonionic surfactant is preferably selected from the group consisting of $C_6$–$C_{20}$ phenol-ethylene oxide condensates, the condensation products of linear or branched aliphatic $C_8$–$C_{20}$ primary or secondary alcohols with ethylene oxide and propylene oxide groups, capped condensation products of linear or branched aliphatic $C_8$–$C_{20}$ primary or secondary alcohols with ethylene oxide and propylene oxide groups, and products made by condensation of ethylene oxide with the reaction products of propylene oxide and ethylene diamine.

Suppression of foaming behavior during the method of the invention is important for improving the effectiveness thereof. In order to further diminish the risk of any foaming behavior, the concentrated stripper solution of the invention preferably additionally comprises 0.1–3% by weight of an antifoam agent.

Preferably the concentrated stripper solution of the invention also comprises an amine compound. Reason is that most polymer films contain zinc ions and that amine compounds are generally capable of forming a stable complex with these zinc ions so as to break down the three-dimensional polymer film structure such that the polymer film can be easily removed by the scrubbing action in step (c) of the method of the invention. In other words, the amine compound is used partially as a solvent and partially as a sequestrant. Said amine compound is suitably present in the concentrated stripper solution at a level of at least 10% by weight, a level of 10 to 25% by weight being preferred. The amine compound is preferably selected from the group consisting of ammonia, monoethanolamine, diethanolamine, triethanolamine, ethylene diamine and mixtures thereof.

Preferably, the concentrated stripper solution further comprises 0.1–5% by weight of a builder material. Said builder material is defined in this connection to be material which is capable of forming a stable complex with the zinc ion present in most polymer films. As a result the structure of such polymer films is broken down such that these films can be easily removed during the scrubbing step. Suitable types of builder material for use in the concentrated stripper solution of the invention are nitrilotriacetate (NTA) methylglycine diacetic acid (MGDA), ethylenediamine tetraacetate (EDTA) and phosphate builders such as pyrophosphate, orthophosphate and tripolyphosphate. It has been found that the time needed for adequately carrying out step (c) of the method of the invention (i.e. for scrubbing the polymer film) can be significantly shortened, when applying a stripper solution of which the temperature is at least 10° C. higher than ambient temperature, and/or raising the temperature of the polymer film to be removed to a similar level. Consequently, it is preferred to apply said concentrated stripper solution at a temperature of 30° C. or higher, a temperature above 40° C. being more preferred. For practical reasons —in view of possible damage to the floor surface when using very high temperatures— the temperature applied during the stripping method of the present invention is preferably below 80° C.

Raising the temperature of the stripper solution and/or the polymer film to be removed, can be done in various ways such as preheating the stripper solution with a heating element, application of infrared radiation or microwave radiation, or application of steam or hot air. For reasons of convenience and safety, the use of infrared radiation is preferred. In view of the foregoing, the floor treating machine of the present invention preferably comprises a heating device, which is suitable for raising the temperature during the stripping method of the invention, desirably by providing infrared radiation.

In the method of the invention, the contact time for allowing the concentrated stripper solution to chemically act on the polymer film during step (b) is at least 5 seconds. In order to be able to effectively apply the method of the invention as an integrated process using one floor treating machine, a contact time in the range of 5–15 seconds is preferred.

The scrubbing device used in step (c) of the method of the invention may generally be a brush or a pad of any suitable shape. It is required to reduce the viscosity of the concentrated stripper solution during the scrubbing step (c), in order to improve the scrubbing performance and to ensure that the subsequent vacuum cleaning step (d) can be suitably carried out. Said viscosity reduction can be effectively accomplished by diluting the concentrated stripper solution with water during step (c) such that the diluted solution obtained contains less than 30% by weight of the concentrated solution. Preferably a water to concentrated stripper solution dilution ratio of at least 10:1 (by weight) is applied. Depending on the thickness of the polymer film to be removed using the method of the invention, the amount of concentrated stripper solution effectively needed per $m^2$ of treated polymer film was found to be 5–40 ml, preferably 15–25 ml.

Usually, the stripping method of the invention is carried out in order to replace an old floor polymer film and to apply a new polymer layer to the floor surface concerned.

A preferred floor treating machine for carrying out the method of the invention is schematically shown in FIG. 1. In said figure, a floor treating machine (1) is shown when used for stripping a polymer film (2) from a floor surface (3). A application of concentrated stripper solution (4) in the form of a spray is applied to the polymer film, which after a contact time cooperates with a scrubbing device (5) having a circular cross-section, to disintegrate the polymer film. During scrubbing the stripper solution (4) is diluted with water (6). The sludge (7) formed as a result of the scrubbing action is vacuum cleaned using device (8). A heating device (9) is present on the floor treating machine, for raising the temperature during the stripping method, by applying infrared radiation.

The invention is illustrated by way of the following non-limiting examples in which parts and percentages are by weight unless otherwise indicated. In the Examples the following abbreviations are used:

Plurafac LF 403— Nonionic surfactant, alkoxylated straight chain alcohol (ex BASF AG)

Cocosoap — C12–C16 fatty acid soap of coconut oil

Trilon M — methylglycine diacetic acid trisodium salt

EXAMPLES 1, A

Figure 2A:
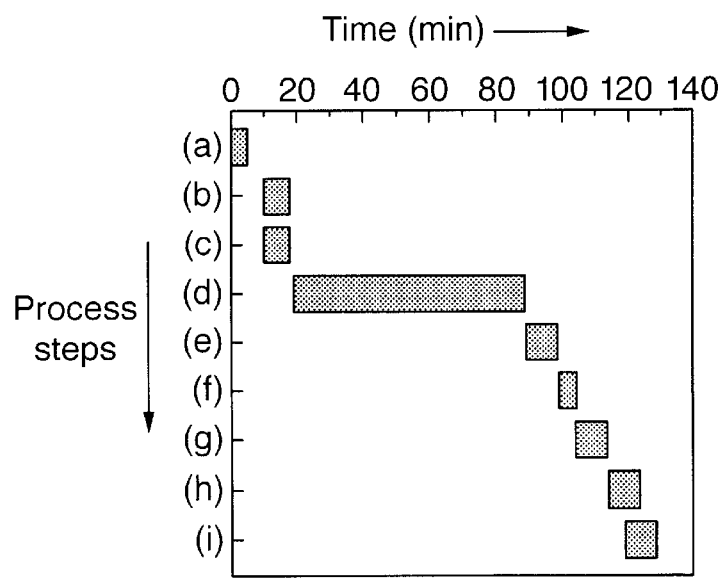
FIG. 2a shows a schematic of time periods of a previous method for treating a surface.

In these examples, the effectiveness of the floor stripping method of the invention was tested and compared with that of a known stripping method of the prior art. Both the prior art method and the integrated method of the invention were carried out using a single disc machine, for stripping 100 m$^2$ of a polymer film (having a thickness of 20 µm) from a floor surface. FIG. 2a shows the prior art method schematically, in particular the time periods needed for carrying out the process steps (a)–(i) of this known method. This known prior art method is now discussed in more detail. After precleaning the surface (step (a)), a diluted floor stripping solution was applied to the polymer film and allowed to chemically act with the polymer film during about 10 minutes (steps (b) and (c)). The diluted stripping solution was obtained by diluting a stripping formulation with water using a formulation/water weight ratio of 1:10.

The stripper formulation -before dilution-had the following composition:

|  | % wt |
| --- | --- |
| Butyldiglycol | 7.0 |
| Monoethanolamine | 8.0 |
| Trilon M | 2.5 |
| Plurafac LF 403 | 0.8 |
| Cocosoap | 0.5 |
| CaCl$_2$ | 0.25 |
| Perfume | 0.1 |
| Water | to100.0 |

After the chemical action by the diluted stripper formulation (step (c)), the polymer film was scrubbed in step (d), using an abrasive pad of circular shape (having a diameter of ca. 0.4 m) and mounted on a single disc machine. The rotation speed of the pad was 120 rpm. This scrubbing action needed to last more than 1 hour for obtaining favourable results.

Subsequently, the thus-formed sludge was vacuumcleaned in step (e) and the floor surface was rinsed with water in step (f). To obtain a clean floor surface and remove all residual polymer film material, the steps of vacuumcleaning and rinsing were carried out a second time (steps (g) and (h)). Finally, the floor surface was dried. It can be noticed that the full method of the prior art discussed above and shown in FIG. 2a took roughly 120 minutes to be carried out.

FIG. 2b shows schematically the integrated floor stripping method (A) of the invention, in particular the time period needed for carrying out this method. It can be seen that this time period is about 60 minutes. This integrated floor stripping method (A) was carried out using one single disc floor treating machine.

A concentrated stripping formulation having a composition equal to that of the concentrated solution used in the above-described known stripping method, was sprayed onto the polymer film in the first step of this integrated process of the invention.

This concentrated stripping solution was allowed to chemically act on the polymer film during an undisturbed contact time of about 9 seconds. During the subsequent scrubbing step, the concentrated solution was diluted with water using a water to concentrated solution weight ratio of 10:1. The scrubbing step was carried out at ambient temperature, using an abrasive pad of circular shape (diameter:0.4 m) mounted on a single disc machine and running at a rotation speed of 174 rpm.

As part of the integrated method of the invention, vacuumcleaning and drying steps were carried out for removing the sludge formed during the scrubbing step respectively for bringing the floor surface in a condition wherein a new polymer layer can be effectively applied to the floor surface.

In view of the foregoing it can be concluded that the integrated polymer stripping method of the invention is approximately twice as effective as the tested stripping method of the prior art.

EXAMPLE 2

In this example, the effect of both the contact time and the temperature on the performance of the integrated method of the invention, was tested when this method was used for removing a polymer film having a thickness of 20 µm. For the tests, PVC tiles (length:0.18 m, breadth:0.15 m) to which this polymer film was applied, were used. Said PVC tiles were artificially aged to resemble a worn floor surface after one year of frequent use. Furthermore, a laboratory set-up as schematically shown in FIG. 3 was used. This set-up can be seen as a scaled-down system resembling the operating performance of an integrated single disc machine as shown in FIG. 1. This set-up includes a conveyor belt (11) which forms a closed loop and which can move in the direction indicated by the arrow. On the conveyor belt a floor tile (12) having a polymer layer to be removed, can be placed. During the tests a concentrated stripper solution is applied to the floor tile using an applicator device (13). Subsequently, the concentrated stripper solution and the floor tile are heated by steam coming out of steam applicator (14). Using a scrubber device (16) and the heated concentrated solution the polymer film is broken down, while the solution is diluted with water which is fed to the floor tile by the device (15). Finally, the tested floor tile is vacuum cleaned using vacuum cleaning device (17).

The composition of the concentrated stripper solution used in these tests (i.e. sprayed on to the tested floor tiles by device (13)) is the following:

|  | % wt |
| --- | --- |
| Butyldiglycol | 18.0 |
| Monoethanolamine | 18.0 |
| NaOH | 1.0 |
| Trilon M | 1.6 |
| Plurafac LF 403 | 1.0 |
| Cocosoap | 1.0 |
| Water | up to 100.0 |

The water to concentrated solution ratio applied during these tests was equal to that applied in Example 1.

First the performance was tested at a temperature of 25° C., applying various undisturbed contact time periods —in the range of 1–10 seconds— for allowing the stripper solution to chemically act on the polymer film. Subsequently, the performance was tested at a temperature of 35° C., again applying various undisturbed contact time periods. The temperature was raised by applying steam and by raising the temperature of the water of dilution fed to the tested floor tiles via device (15).

The performance results were measured in terms of the gloss of the floor surface after removal of the polymer film (i.e. after carrying out the full integrated method). In this connection, the gloss is defined as the light reflection measured at an angle of 85° C. (between incoming and reflected light) using a Minolta Multi Gloss 268 machine, whereby a gloss of 100 means total reflection and a gloss of 0 means no reflection.

Figure 4:
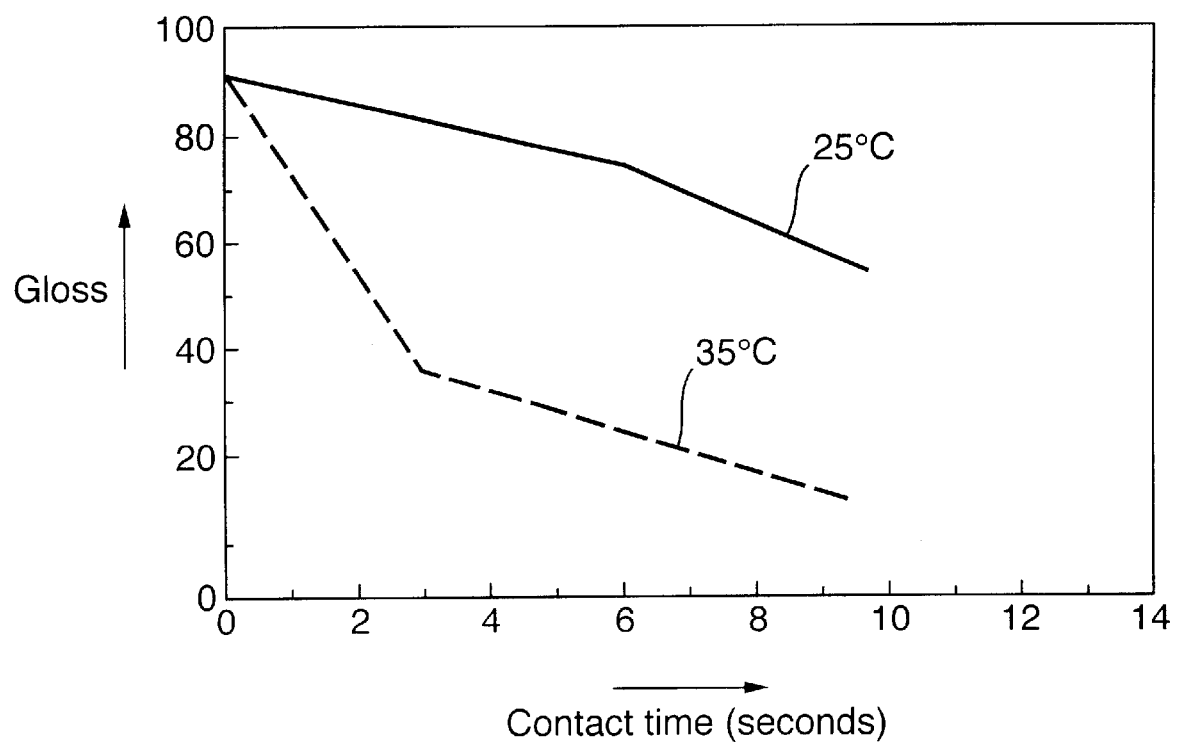
FIG. 4 shows stripping performance test results.

It is further noted that a lower gloss figure of the treated surface means a better stripping performance. Adequate floor stripping is generally achieved when the gloss of the treated floor surface is lower than 20. In FIG. 4, the results of the tests carried out in this example are shown. It can be noticed that the stripping performance could be considerably improved by raising the temperature and that, for the aged floor tiles tested, adequate results could only be achieved when applying a temperature of 35° C.

We claim:

1. A method for stripping a polymer film from a floor surface, comprising the steps of:
   (a) applying a concentrated alkaline stripper solution having at most 75% by weight water, to the polymer film;
   (b) allowing the concentrated alkaline solution to chemically act on the polymer film during a contact time of at least 5 seconds;
   (c) scrubbing the polymer film with a scrubbing device while diluting the concentrated alkaline solution with water, so as to obtain a sludge;
   (d) vacuum cleaning the floor surface to remove the sludge and the polymer film wherein the method is carried out with a floor treating machine.

2. The method according to claim 1 wherein the concentrated alkaline stripper solution is applied to the polymer film at a temperature of 30° C. or higher.

3. The method according to claim 1 wherein the temperature at which said method is carried out is raised by applying infrared radiation.

4. The method according to claim 1 wherein the concentrated alkaline stripper solution. used in step (a) has a pH of 9 or higher.

5. The method according to claim 1 wherein the solvent is present in the concentrated alkaline stripper solution at a concentration of at least 5% by weight.

6. The method according to claim 1 wherein the solvent is selected from the group consisting of glycolethers, diglycolethers, benzyl alcohol and mixtures thereof.

7. The method according to claim 1 wherein the concentrated alkaline stripper solution comprises an alkaline agent selected from the group consisting of alkali metal hydroxide, alkali metal carbonate, and alkali metal metasilicate.

8. The method according to claim 1 wherein the concentrated alkaline stripper solution further comprises 0.1–3% by weight of a nonionic surfactant as a wetting agent.

9. The method according to claim 8 wherein the nonionic surfactant is selected from the group consisting of $C_6$–$C_{20}$ phenol-ethylene oxide condensates, the condensation products of linear or branched aliphatic $C_8$–$C_{20}$ primary or secondary alcohols with ethylene oxide and propylene oxide groups, capped condensation products of linear or branched aliphatic $C_8$–$C_{20}$ primary or secondary alcohols with ethylene oxide and propylene oxide groups, and products made by condensation of ethylene oxide with the reaction products of propylene oxide and ethylene diamine.

10. The method according to claim 1 wherein the concentrated alkaline stripper solution further comprises at least 10% by weight of an amine.

11. The method according to claim 10 wherein the amine is selected from the group consisting of ammonia, monoethanolamine, diethanolamine, triethanolamine, ethylene diamine and mixtures thereof.

12. The method according to claim 1 wherein the concentrated alkaline stripper solution further comprises 0.1–5% by weight of a builder material.

13. The method according to claim 1 wherein the contact time used in step (b) is in the range of 5–15 seconds.

14. The method according to claim 1 wherein the scrubbing device used in step (c) is a rotatable brush or pad.

15. The method according to claim 1 wherein during step (c) the concentrated alkaline stripper solution is diluted with water such that the diluted solution obtained contains less that 30% by weight of the concentrated solution.

* * * * *